(12) United States Patent
Illmann

(10) Patent No.: US 7,696,994 B2
(45) Date of Patent: Apr. 13, 2010

(54) PIPELINE PROCESSING OF IMAGE DATA WITH A LOW-RESOLUTION DISPLAY OF INTERMEDIATE RESULTS

(75) Inventor: Joerg Illmann, Neu-Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 605 days.

(21) Appl. No.: 10/991,524

(22) Filed: Nov. 19, 2004

(65) Prior Publication Data

US 2005/0162671 A1    Jul. 28, 2005

(30) Foreign Application Priority Data

Nov. 20, 2003  (DE) .............................. 103 54 226

(51) Int. Cl.
- *G06T 15/30* (2006.01)
- *G06F 15/80* (2006.01)
- *G06T 1/20* (2006.01)
- *G06K 9/36* (2006.01)

(52) U.S. Cl. .................. 345/423; 345/505; 345/506; 382/232

(58) Field of Classification Search .......... 345/423, 345/505, 506; 382/232–234, 240
See application file for complete search history.

(56) References Cited

U.S. PATENT DOCUMENTS

| | | | |
|---|---|---|---|
| 6,545,687 B2 * | 4/2003 | Scott et al. .................. | 345/629 |
| 6,549,674 B1 * | 4/2003 | Chui et al. .................. | 382/240 |
| 6,711,298 B1 * | 3/2004 | Amonou .................... | 382/240 |
| 6,904,176 B1 * | 6/2005 | Chui et al. .................. | 382/240 |
| 6,956,974 B1 * | 10/2005 | Ito et al. .................... | 382/240 |
| 7,006,697 B1 * | 2/2006 | Gormish et al. ............. | 382/234 |

FOREIGN PATENT DOCUMENTS

| WO | WO 02/45004 A1 | 6/2002 |
|---|---|---|
| WO | WO 2004/030343 A1 | 4/2004 |

OTHER PUBLICATIONS

M.Manohar, J.C.Tilton: "Progressive Vector Quantization on a Massively Parallel SIMD Machine with Application to Multispectral Image Data", in: IEEE Transactions on Image Processing, vol. 5, No. 1, Jan. 1996, S.142-147.

B.E.Usevitch: "A tutorial on modern lossy wavelet image compression: foundations of JPEG 2000", in: IEEE Signal Processing Magazine. 2001, S.22-35, ISSN: 1053-5888.

Prof. Dr. Peter A. Henning, "Taschenbuch Multimedia", 2. Auflage von, pp. 102-103.

* cited by examiner

*Primary Examiner*—Hau H Nguyen
(74) *Attorney, Agent, or Firm*—Harness, Dickey & Pierce, P.L.C.

(57) ABSTRACT

A method and an apparatus are for displaying an image. The image is broken down in accordance with a scheme, which can be predetermined, into sections, so-called chunks. The chunks are supplied to a pipeline for processing, on the basis of a scheme which can likewise be predetermined. The pipeline includes a large number of pipeline processors, which operate at a specific resolution level. The chunks are then combined again to form an image at the specific resolution level, and are displayed as an intermediate result. This process is repeated iteratively until the highest resolution level is reached.

32 Claims, 3 Drawing Sheets

PIPELINE PROCESSING OF IMAGE DATA WITH A LOW-RESOLUTION DISPLAY OF INTERMEDIATE RESULTS

The present application hereby claims priority under 35 U.S.C. §119 on German patent application number DE 103 54 226.4 filed Nov. 20, 2003, the entire contents of which are hereby incorporated herein by reference.

FIELD OF THE INVENTION

The invention generally relates to the field of image processing and relates in particular to a method and an apparatus for processing image data, in particular for displaying an image, with the image data being processed at two or more resolution levels, which are increased in steps.

BACKGROUND OF THE INVENTION

From work with the Internet, it is known that the process of downloading pages or web contents with images is frequently very time-consuming.

However, even in the case of applications which are not based on the World Wide Web, the process of displaying image data, video data etc. on the screen leads to the disadvantage that the desired image is not produced until all of the image data has finally been processed. Prior to this, the user sees nothing. This leads to the further disadvantageous effect that the user is also not informed about the current processing stage, and is therefore forced to wait for an unpredictable time period before the image is formed completely.

Particularly in the case of medical applications, it is even in some cases sensible and sufficient to terminate an image construction process prematurely, if it is already evident that the image to be formed does not satisfy the current requirements. It is then possible to save the waiting time which would have been required to construct the image completely.

If, for example in the course of a consultation, the state of a patient with regard to his lung is intended to be discussed on the basis of X-ray records, then the corresponding images are loaded from an archive. However, if it is evident while an image is being loaded that this is not, for example, the record of a lung but of a leg, then the process of constructing the image can be terminated without this leading to unnecessary waiting times.

SUMMARY OF THE INVENTION

It is therefore desirable to have a method which allows intermediate results in the image construction process to be displayed. The procedure according to embodiments of the invention may, however, also be used for any other desired fields of application.

One object of an embodiment of the invention is to indicate a way/method/device in which the process of image construction can be carried out more quickly and flexibly, and/or which also may allow intermediate results of the image construction process to be displayed as well.

An object of an embodiment may be achieved by a method including:
  decomposition of the image into chunks,
  processing of the chunks in a pipeline with sequentially operating pipeline processors with iteratively increased resolution levels,
  combination of the processed chunks to form an image.

A further object relates to an apparatus for processing image data, in particular for displaying an image, with the image data being processed at two or more resolution levels, having:
  at least one splitter which is intended for decomposing the image into chunks,
  at least one pipeline processor in a pipeline, with the pipeline processors being intended for processing the chunks and being switched sequentially, and each operating at a resolution level which can be increased iteratively for each pipeline run,
  at least one merger which is intended for combination of the processed chunks to form a result, preferably an intermediate result or a final result in the form of an image with a specific resolution.

The basic idea of an embodiment of the invention is that the processing process can be subdivided into a number of sub-processes. To do this, the image has to be broken down into a number of segments, so-called chunks. Each chunk can then be processed individually, and independently of one another. The process of image construction can thus be made modular and more flexible.

In an exemplary embodiment of the invention, at least one intermediate result of an image construction process is displayed. An intermediate result may be displayed once each processing process in a pipeline run has been completed. The i-th intermediate result is thus an image in which the reassembled chunks are at the i-th resolution level. Displaying the intermediate images results in the advantage for the user that he can obtain an overview of the image, and of rough details of the image, even at an early stage.

In this embodiment of the invention, only one pipeline is provided, and includes a large number of pipeline processors. The processors in the pipeline all operate at the same resolution level. The process starts at the lowest resolution level in the first iteration step, and is then incremented iteratively—after the end of the processing steps in the pipeline—until it reaches the value of the highest resolution level. The image can then be displayed with the highest resolution, as the final result.

An intermediate result can advantageously be displayed after completion of the processing processes in the pipeline and/or after processing the chunks at a respective resolution level. An intermediate result is then produced in each case for all of the resolution levels.

However, an alternative embodiment provides for an intermediate result not to be displayed for each resolution but only for a predeterminable number of resolution levels, which the user can set using a user interface. This results in the advantage that the user can himself select the timeframe for displaying intermediate results. He can thus adaptively and dynamically influence the process of image construction.

The basis for the separate processing of the chunks is a breakdown or segmentation of the image. This is preferably achieved by halving the length and the width of the image parallel to the axes, thus splitting the image into four parts. In alternative embodiments, different subdivision or segmentation rules may be used in this case, such as multiple subdivision of the length and of the width. Vector quantization is used to determine the segmentation into blocks or rectangles parallel to the axes.

Once the image has been broken down into chunks, this results in a large number of chunks to be processed. It is now necessary to define the sequence in which these chunks will be processed and/or the scheme which will be used as the basis for assigning them to the pipeline processors.

At least one embodiment of the invention envisages three different variants for the scheme for this purpose, which the user may choose freely, depending on the application:

a deterministic mechanism, a randomized mechanism, and an entropy-based mechanism.

In the case of the deterministic mechanism, the sequence is defined by way of the position of the chunk within the image, starting at the top on the left, and ending at the bottom on the right. The sequence of processing is thus implicitly predetermined by the position. The data is passed on, or is transferred to the subsequent processor in the pipeline, with increased resolution. One advantage of this approach is that no additional meta information relating to the resolution and position of the respective chunk need be stored and processed, since this is implicitly predetermined by the mechanism.

In the randomized mechanism, the association between the pipeline processor and the chunk is made on the random number principle. However, to do this, meta information must also be provided, in particular meta information about the position of the chunk within the overall image. One advantage of this approach is that the chunks are better distributed over the image of the intermediate result, with different resolutions.

The entropy-based mechanism is based on calculation of the entropy of the pixels which are associated with one chunk. One advantage of this mechanism is that the chunks which include most of the image information and are thus the major components of the image are the first to be processed and displayed. Chunks which carry only a little image information and are thus less relevant for the overall impression of the image are dealt with and processed with a lower priority. This approach means that it is possible to link the computer resources to, and to focus them at, the processing processes which carry relevant image information.

In one advantageous development of an embodiment of the invention, a large number of pipelines, acting in parallel, are provided rather than just one pipeline including two or more pipeline processors. In this model, the individual chunks are in each case passed to one pipeline for processing. The individual pipeline processors in the pipeline are then intended to process only one chunk, with the resolution level being increased from one processor to the next. The first pipeline processor in each pipeline thus operates at the lowest resolution level, while the last pipeline processor in each pipeline provides the highest resolution level.

The chunks can be combined again after this processing. Since the pipelines operate in parallel, an intermediate result can be displayed by combination of the chunks after processing of all the first pipeline steps and all the first pipeline processors. The i-th intermediate result relates to an image composed of combined chunks at the i-th resolution level. In this embodiment, the number of pipeline processors matches the number of resolution levels, and the number of pipelines matches the number of chunks, with all of the pipeline processors in one pipeline processing the same chunk, and with the resolution being increased iteratively from one pipeline processor to the next.

The embodiments of the method according to the invention and as described above may also be in the form of a computer program product, having a computer-legible medium and a computer program in which the computer is caused to carry out the method according to the embodiments of the invention as described above, once the computer program has been loaded.

An alternative object is achieved by a memory medium which is intended for storage of the computer-implemented method as described above, and which can be read by a computer.

BRIEF DESCRIPTION OF THE DRAWINGS

Exemplary embodiments, which should not be regarded as restrictive, together with their features and further advantages, will be discussed in the following detailed description of the figures and with reference to the drawing, in which.

Embodiments of the invention may relate to a method and an apparatus for electronic processing and displaying of images or video images.

Figure 5:
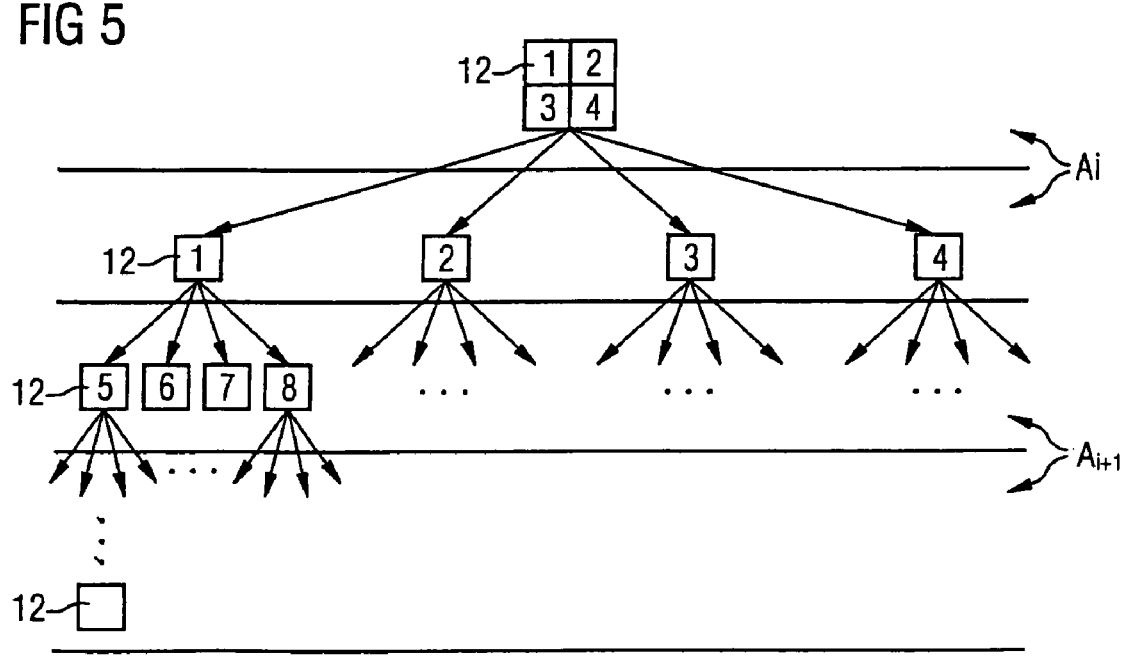
FIG. 5 shows a tree structure based on one form of decomposition of the image, according to one exemplary embodiment of the invention.

As illustrated in the overview in FIG. 5, an image 10 is broken down or split using a mechanism which can be selected by the user. In an exemplary embodiment of the invention, the image is segmented into 4 blocks of equal size. The parts or blocks produced in this way are referred to as chunks 12. The chunk 12 is thus a section from the original image, and is defined by a specific resolution Ai and/or a specific image position.

As can be seen in FIG. 5, the division into four parts results in a quadruple tree structure or a quad tree, which extends as far as the leaves of the tree as the resolution Ai increases.

Figure 1:
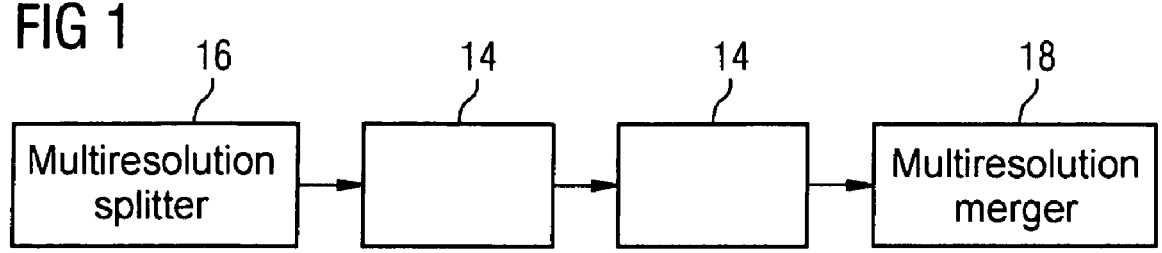
FIG. 1 shows a schematic illustration of components of an apparatus according to an embodiment of the invention.

FIG. 1 shows that an embodiment of the invention is based essentially on the following components: a splitter 16 which is intended for breaking down or segmentation of the image, and which precedes a pipeline. This is followed by a large number of pipeline processors 14, which are intended to process the image 10 and/or the chunks 12.

The final element in the pipeline, or a separate element arranged after it, is a merger 18 which is intended to combine the chunks 12 that have been processed in the pipeline to form a result 20, 22. The result 20, 22 is advantageously displayed. In an exemplary embodiment of the invention, each intermediate result 20 that is produced after each pipeline run, and/or a final result 22 which is produced after the last pipeline run at the highest resolution level Ai, are/is displayed.

The basic procedure for the method according to an embodiment of the invention will be described in the following text with reference to FIG. 3.

The image 10 to be processed is supplied to the splitter 16, which breaks the image down into chunks 12 in accordance with a scheme which can be determined in advance. The preferred scheme is segmentation by horizontal and vertical bisection of the original image 10, or bisection of the height and width of the original image 10. However, other decomposition schemes may also be chosen in other embodiments.

In the first run through the pipeline, the resolution level Ai is set to the lowest value. The chunks 12 are supplied sequentially to the first pipeline processor 14, which passes the respective chunk 12 to the next subsequent pipeline processor 14, after processing. At the end of this chain, the chunks 12 are supplied to the merger 18, which combines the chunks 12 again at the respective resolution level to form an image which can then be displayed. The resolution level is increased again after a pipeline run.

Figure 3:
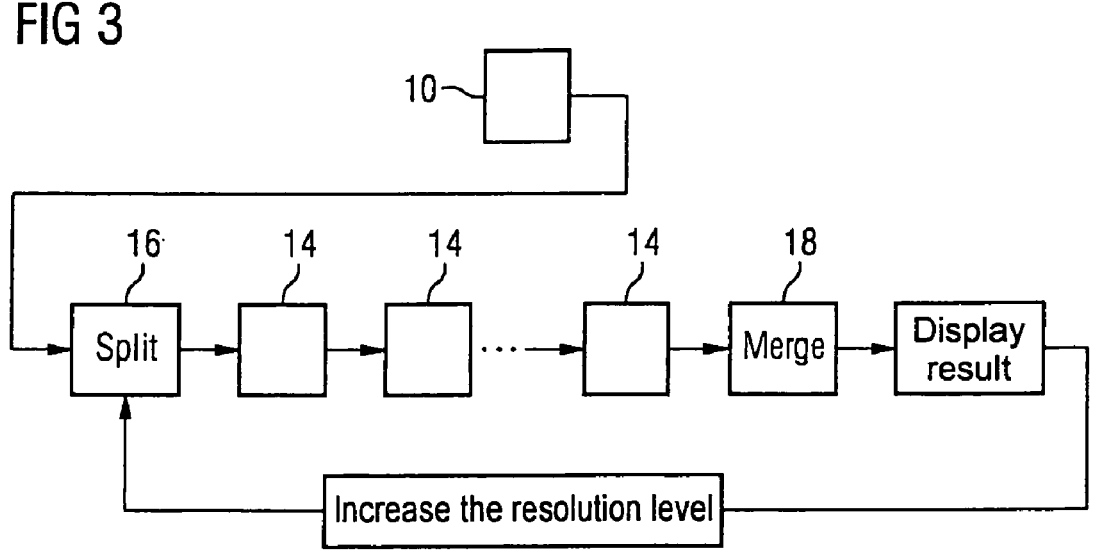
FIG. 3 shows an illustration, in the form of an overview, of a pipeline.

Provided that the highest resolution level Ai has not yet been reached, the procedure just described—as illustrated in FIG. 3—is carried out iteratively until the highest resolution level is reached, and the final result can be displayed. The purpose of the pipeline is therefore to sequentially carry out different processing steps on the chunk 12.

Figure 4:
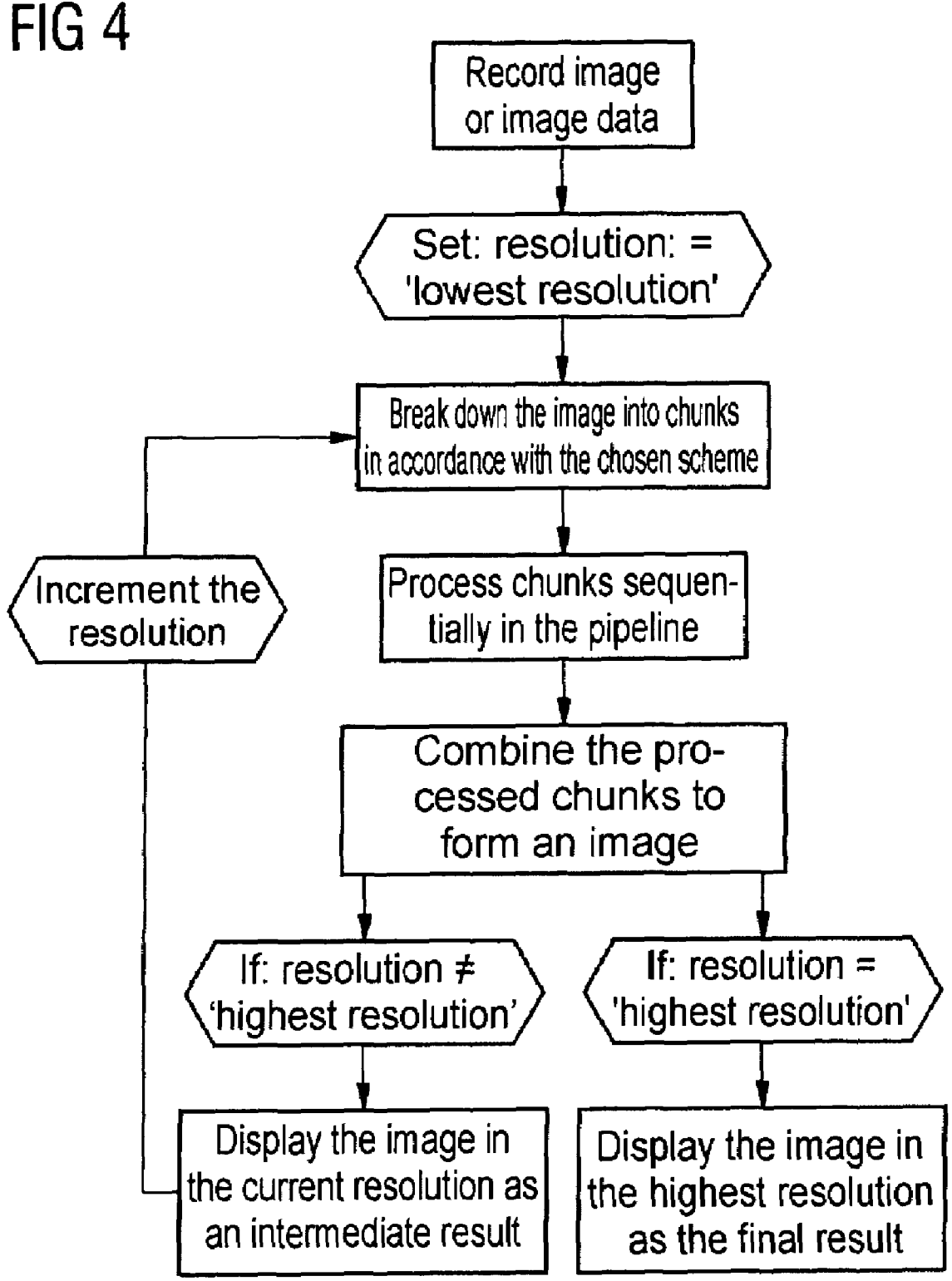
FIG. 4 shows a flowchart illustrating one procedure according to the invention, based on one exemplary embodiment of the invention.

FIG. 4 shows a procedure for an exemplary method according to an embodiment of the invention. Once the image 10 has been recorded and has been broken down or split into the chunks 12, the pipeline process is carried out iteratively with increasing resolution levels Ai. This iteration thus relates to the resolution and is annotated by the arrow pointing upwards in FIG. 4. However, the method also includes a further iteration which is not illustrated: specifically, the sequential processing within the pipeline. This iteration relates to the processing of the individual chunks 12. The invention is thus based on a double iteration: both with regard to the resolution Ai, and with regard to the chunks 12.

In contrast to previous methods according to the prior art, the image 10 is not transferred as a complete data record but, according to an embodiment of the invention, only parts of the image 10, the chunks 12, are passed from one pipeline processor 14 to the next. This advantageously means that the pipeline processors 12 may have a considerably simpler and leaner design.

Figure 2A:
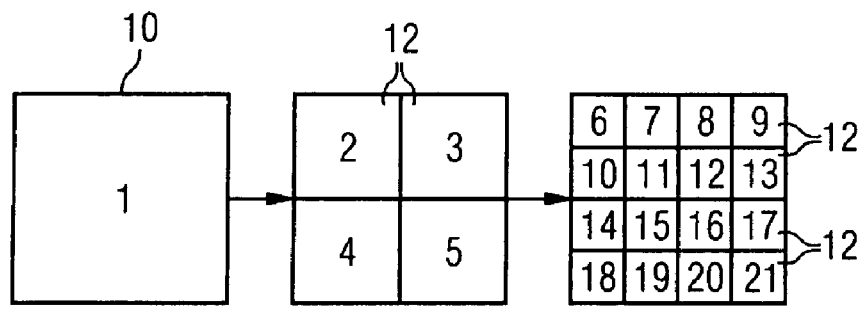
FIG. 2a shows a deterministic scheme, which is used to allocate chunks to a pipeline processor.
Figure 2B:
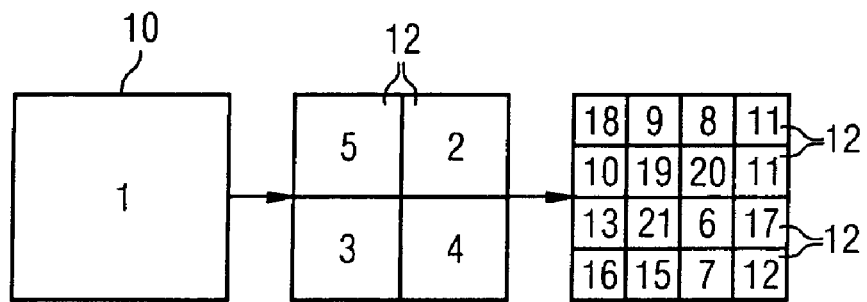
FIG. 2b shows a randomized scheme, which is used to allocate chunks to the pipeline processor.
Figure 2C:
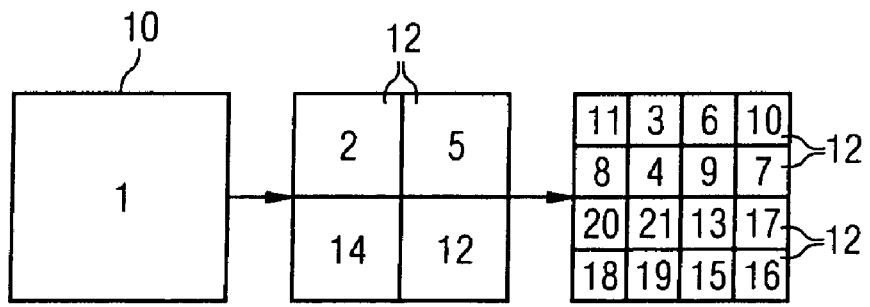
FIG. 2c shows an entropy-based scheme which is used to allocate chunks to the pipeline processor.

An embodiment of the invention preferably provides three schemes, which are sketched in FIGS. 2a to 2c, which are used to define the sequence in which the chunks 12 are sent to the pipeline, and the time at which they are processed within the pipeline.

A deterministic approach provides for the processing sequence to be predetermined implicitly from the position of the chunks 12 in the image 10, starting at the left, top corner and ending at the right, bottom corner of the image 10, so that no additional meta data relating to the position of the chunk 12 within the image 10 need be coded and passed on.

In the randomized mechanism, the association between the pipeline processor 14 and the chunk 12 is made on the random number principle.

The entropy-based mechanism is based on calculation of the entropy of the chunk 12. This is based on the number of pixels which are associated with one chunk 12 and/or on the information density in a chunk 12. The chunk 12 which contains the most information is therefore the first to be processed in the pipeline.

The user can advantageously use a user interface to select the desired mechanism, and thus to flexibly match the image construction to the current requirements. For example, it may be more worthwhile to process an image 10 which has a uniformly distributed pattern using the randomized approach, for example a section of a map which contains elements with a very large amount of information and elements with very little information.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable involatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable involatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for constructing an image of processed image data of the image, with the image data being processed in a number of resolution levels, the method comprising:
    decomposing the image at a first resolution level, the image being decomposed into a first set of chunks corresponding to the first resolution level, each chunk in the first set of chunks corresponding to a different section of the image;
    processing, in a pipeline, the first set of chunks in a pipeline run, the pipeline including sequentially operating pipeline processors;
    combining the processed first set of chunks to form a combined first image as a result; and
    iteratively performing the decomposing, processing, and combining at increasing resolution levels if the resolution level of the combined first image is less than a threshold resolution level.

2. The method as claimed in claim 1, further comprising:
    displaying the combined first image if the resolution level of the combined first image is greater than or equal to the threshold resolution level.

3. The method as claimed in claim 2, further comprising:
    displaying an i-th intermediate result of the combined first image, which is in each case produced after completion of all the processing processes in the pipeline run with an i-th resolution level.

4. The method as claimed in claim 3, wherein the processing of the chunks is entropy-based.

5. The method as claimed in claim 2, wherein the processing of the chunks is based on a deterministic mechanism.

6. The method as claimed in claim 2, wherein the pipeline includes at least two pipeline processors, a first of the pipeline processors being a splitter, which decomposes the image into the first set of chunks, and a last of the pipeline processors being a merger, which combines the first set of chunks to form the combined first image.

7. A computer program product having a computer-legible medium on which a computer program is stored, by which the computer is caused to carry out the method as claimed in claim 2.

8. The method as claimed in claim 1, further comprising:
displaying the combined first image as an i-th intermediate result, which is, in each case, produced after completion of all the processing processes in the pipeline corresponding to the i-th resolution level.

9. The method as claimed in claim 8, wherein the processing of the chunks is based on a randomized mechanism.

10. The method as claimed in claim 1, wherein at least two parallel-operating pipelines are provided.

11. The method as claimed in claim 1, wherein a sequence of chunks is assigned to a first pipeline processor within the pipeline based on a predetermined scheme, wherein the chunks in the sequence of chunks are sequentially passed to a subsequent pipeline processor for processing, wherein all of the pipeline processors operate within a pipeline run at the same resolution level, and wherein the resolution levels are increased iteratively.

12. The method as claimed in claim 1, wherein the processing of the chunks is based on a deterministic mechanism.

13. The method as claimed in claim 1, wherein the processing of the chunks is based on a randomized mechanism.

14. The method as claimed in claim 1, wherein the processing of the chunks is entropy-based.

15. The method as claimed in claim 1, wherein the pipeline includes at least two pipeline processors, a first of the pipeline processors being a splitter, which decomposes the image into the first set of chunks, and a last of the pipeline processors being a merger, which combines the processed first set of chunks to form the combined first image.

16. A computer program product having a computer-legible medium on which a computer program is stored, by which the computer is caused to carry out the method as claimed in claim 1.

17. The method as claimed in claim 1, wherein the method is for processing image data for displaying an image.

18. The method of claim 1, wherein the iteratively performing further comprises:
decomposing the image into a second set of chunks at a higher resolution level;
processing, in the pipeline, the second set of chunks in a subsequent pipeline run;
combining the processed second set of chunks to form a combined second image as a result, the combined second image having a higher resolution level than the combined first image.

19. An apparatus for constructing an image of processed image data of the image, with the image data being processed at at least two resolution levels, the apparatus comprising:
at least one splitter to decompose the image at a plurality of different resolution levels, wherein
during each decomposition of the image, the splitter decomposes the image into a set of chunks corresponding to a resolution level among the plurality of resolution levels, and each chunk corresponding to a different section of the image;
at least one pipeline processor in a pipeline, the at least one pipeline processor being configured to process the set of chunks in a pipeline run, each of the at least one pipeline processors operating at a resolution level among the plurality of resolution levels within each pipeline run; and
at least one merger, the merger being part of the pipeline and being configured to combine the processed set of chunks to form a combined image as a result; wherein the at least one splitter, the at least one pipeline processor and the merger being configured to iteratively decompose, process, and combine, respectively, at increasing resolution levels if the resolution level of the combined image is less than a threshold resolution level.

20. The apparatus as claimed in claim 19, further comprising:
at least one display module to display the combined image in a resolution level if the resolution level of the combined image is greater than or equal to the threshold resolution level.

21. The apparatus as claimed in claim 20, wherein at least two parallel-operating pipelines are provided.

22. The apparatus as claimed in claim 20, wherein a sequence of chunks is assigned to a first pipeline processor within the pipeline based on a predetermined scheme, wherein the chunks are sequentially passed to a subsequent pipeline processor for processing, with all of the pipeline processors operating at the same resolution level per pipeline run.

23. The apparatus as claimed in claim 20, wherein the processing of the chunks is based on a deterministic mechanism.

24. The apparatus as claimed in claim 20, wherein the processing of the chunks is based on a randomized mechanism.

25. The apparatus as claimed in claim 20, wherein the processing of the chunks is entropy-based.

26. The apparatus as claimed in claim 19, wherein at least two parallel-operating pipelines are provided.

27. The apparatus as claimed in claim 19, wherein a sequence of chunks is assigned to a first pipeline processor within the pipeline based on a predetermined scheme, wherein the chunks are sequentially passed to a subsequent pipeline processor for processing, with all of the pipeline processors in a pipeline run operating at the same resolution level during a pipeline run.

28. The apparatus as claimed in claim 19, wherein the processing of the chunks is based on a deterministic mechanism.

29. The apparatus as claimed in claim 19, wherein the processing of the chunks is based on a randomized mechanism.

30. The apparatus as claimed in claim 19, wherein the processing of the chunks is entropy-based.

31. The apparatus as claimed in claim 19, wherein the pipeline includes at least two pipeline processors, wherein a first of the pipeline processors serves as the splitter, and a last of the pipeline processors serves as the merger.

32. The apparatus as claimed in claim 19, wherein the apparatus is for processing image data for displaying an image.

* * * * *